United States Patent
Hoffmann

(10) Patent No.: US 7,742,460 B2
(45) Date of Patent: Jun. 22, 2010

(54) METHOD FOR DETECTING CALLS AND CORRESPONDING UNITS

(75) Inventor: Klaus Hoffmann, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1411 days.

(21) Appl. No.: 10/500,408

(22) PCT Filed: Apr. 30, 2003

(86) PCT No.: PCT/DE03/01398

§ 371 (c)(1),
(2), (4) Date: Jun. 24, 2004

(87) PCT Pub. No.: WO03/096711

PCT Pub. Date: Nov. 20, 2003

(65) Prior Publication Data

US 2005/0105480 A1 May 19, 2005

(30) Foreign Application Priority Data

May 7, 2002 (DE) ................................ 102 20 338

(51) Int. Cl.
 *H04L 12/66* (2006.01)
 *H04M 1/56* (2006.01)
 *H04M 15/06* (2006.01)
 *H04M 11/00* (2006.01)

(52) U.S. Cl. .................. 370/352; 379/88.13; 379/93.01; 379/142.01; 379/142.04

(58) Field of Classification Search .................. 370/352; 379/93.01, 88.13, 133, 197, 142.01, 37, 211.02, 379/188, 142.04; 455/466
See application file for complete search history.

(56) References Cited

U.S. PATENT DOCUMENTS

| | | | | |
|---|---|---|---|---|
| 5,970,128 | A | * 10/1999 | Kim | ...................... 379/142.01 |
| 6,393,113 | B1 | * 5/2002 | Karras | ........................ 379/133 |
| 6,584,188 | B2 | * 6/2003 | Kim | ...................... 379/211.02 |
| 6,654,452 | B1 | * 11/2003 | Murray et al. | ............... 379/197 |
| 6,738,456 | B2 | * 5/2004 | Wrona et al. | .................. 379/37 |
| 2003/0043974 | A1 | * 3/2003 | Emerson, III | ............ 379/88.13 |
| 2003/0083078 | A1 | * 5/2003 | Allison et al. | ............... 455/466 |
| 2005/0259796 | A1 | * 11/2005 | Wallenius et al. | ........ 379/93.01 |

FOREIGN PATENT DOCUMENTS

| | | |
|---|---|---|
| DE | 19810869 A1 | 9/1999 |
| EP | 0 792 074 A2 | 8/1997 |
| JP | 2006-103701 | 4/2006 |
| WO | WO9818268 A1 | 4/1998 |
| WO | WO 02/15627 A1 | 2/2002 |

OTHER PUBLICATIONS

Fredrik Thernelius, "SIP, NAT, and Firewalls", Master's Thesis, May 2000, pp. 1-69.

* cited by examiner

Primary Examiner—Thjuan K Addy

(57) ABSTRACT

Disclosed is a method in which a detection request, by means of which an identifier of a calling terminal is to be detected, is addressed to a signaling unit by a called terminal. The called terminal is connected to a data packet transmission network. The signaling unit signals according to a signaling protocol that has been defined for the transmission of data in a data packet transmission network. The detection request is transmitted along with a message and/or an information element which has been established for signaling in the data packet transmission network.

18 Claims, 3 Drawing Sheets

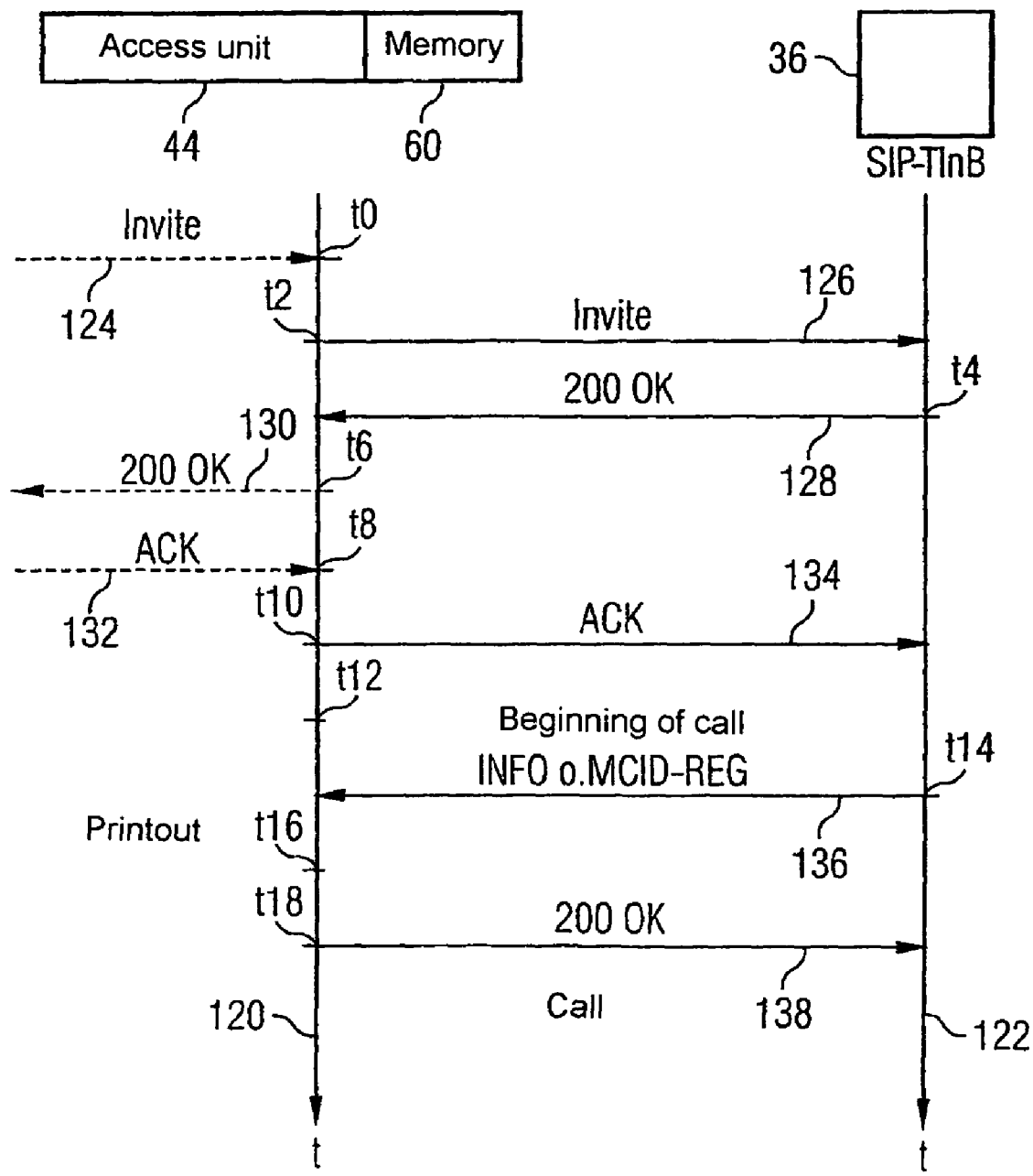

METHOD FOR DETECTING CALLS AND CORRESPONDING UNITS

CROSS REFERENCE TO RELATED APPLICATIONS

This application is the US National Stage of International Application No. PCT/DE03/01398, filed Apr. 30, 2003 and claims the benefit thereof. The International Application claims the benefits of German Patent application No. 10220338.5 DE filed May 7, 2002, both of the applications are incorporated by reference herein in their entirety.

FIELD OF INVENTION

The invention relates to a method in which a call request is sent from a calling terminal device by way of a signaling unit to a called terminal device in order to enable a data transmission between the terminal devices. User data is then transmitted between the calling terminal device and the called terminal device, call data for example. For example, a detection request is sent to the signaling unit from the called terminal device during the data transmission or in conjunction with the signaling relating to the data transmission. For example, on the basis of the detection request the signaling unit notes an identifier for the calling terminal device, for example the identifier is saved, saving of the identifier is initiated or the identifier is output on an output unit.

BACKGROUND OF INVENTION

For data transmission networks using circuit-switching, such a method is set down in the ITU-T standard (International Telecommunication Union—Telecommunication Standardization Sector)—Q.951.7, "Stage 3 description for number identification supplementary services using DSS 1: Malicious Call Identification (MCID)". The performance feature is used in particular in conjunction with the preparation of legal proceedings.

In a data transmission network using circuit-switching the data is transmitted in time channels in accordance with a time-division multiplex method. Before data transmission takes place, the time channels are through-connected in a connection establishment phase and then remain reserved for the terminal devices involved in the call for the duration of the call. The data comprises for example call data or video data, such as is produced during a videoconferencing session.

With regard to the known method, the identifier is a subscriber number whose format is set down in the ITU-T standard E.164. The subscriber number is the means by which the calling terminal device, in other words the terminal device which transmits the call, can be reached in the circuit-switched data transmission network.

With regard to the known method, the signaling units are switching centers in a public telephone network. The signaling units perform signaling in accordance with a standardized protocol, in particular as per ISUP (Integrated Services digital network—User Part). With regard to the known method, both terminal devices are always situated in the circuit-switched data transmission network.

SUMMARY OF INVENTION

The object of the invention is to specify a simple method which serves in particular to extend the application area for the "Detection of Calls" performance feature. A corresponding terminal device, a corresponding signaling unit and corresponding programs are also to be specified.

The object relating to the method is achieved by the method steps set down in claim 1. Developments are set down in the subclaims.

With regard to the method according to the invention, the called terminal device is a terminal device in a data transmission network. In addition, the signaling unit performs signaling in accordance with a signaling protocol which has been defined for data transmission in a data transmission network.

In a data packet transmission network the data is transmitted in data packets which normally have a packet header and a packet body. The packet header contains details about the recipient of the data packet. In this way the data packets can be forwarded in the data packet transmission network without any additional requirement to establish a connection on lower protocol layers. One example of a data packet transmission network is a data packet transmission network operating according to the Internet Protocol, for example the Internet. There are also other data packet transmission networks, however, such as the ATM network (Asynchronous Transfer Mode) for example, in which the data packets are also designated as cells.

The following are examples of signaling protocols in data packet transmission networks:
  the protocols of the ITU-T H.323 protocol family, in particular the H.225 protocol,
  the SIP protocol (Session Initiation Protocol) according to RFC 2543 or RFC 2543 bis of the IETF (Internet Engineering Task Force), or
  an ATM signaling protocol.

The signaling protocols for data transmission in a data packet transmission network differ considerably from the signaling protocols for a circuit-switched data transmission network and have previously been defined largely independently of these signaling protocols.

By using the method according to the invention it is possible to achieve the situation where the "Detection of Calls" performance feature can then also be employed when the called terminal device is situated in a data packet transmission network. The application area for the "Detection of Calls" performance feature is thus considerably extended because a large proportion of terminal devices are connected to data packet transmission networks. The proportion of these terminal devices in the total number of terminal devices in circuit-switched data transmission networks and in data packet transmission networks continues to increase.

With regard to a development of the invention, the detection request is transmitted along with a message and/or an information element which has been defined for signaling in the data packet transmission network. In the case of the development, a detection request is used which was required to be defined additionally for the relevant signaling protocol of the signaling unit.

With regard to an alternative development, an identifier for the called terminal device is preferably stored in the signaling unit in conjunction with the "General Detection of Calls" performance feature. Upon arrival of the call request, a check is performed by the signaling unit (44) as to whether the identifier of the terminal device to be called has been stored. The identifier of the calling terminal device is noted when the identifier of the terminal device to be called (36) has been stored. Therefore, with regard to this development there is no need to define a separate detection request and to generate this with reference to individual calls.

With regard to a development of the method according to the invention, the identifier is conveyed to the signaling unit in conjunction with the call request. This action makes it possible to note the identifier without it previously needing to have been requested by means of a more complex method.

With regard to a next development of the method for detecting calls, the calling terminal device is a terminal device in a circuit-switched data transmission network. The identifier of the calling terminal device is requested as a result of the detection request by the signaling unit by way of a network transition unit (used for signaling purposes) to the circuit-switched data transmission network with the aid of an identifier request. In order to process the identifier request in the circuit-switched data transmission network a standardized method is employed, in particular a method in accordance with ITU-T standard Q.731.7, "Stage 3 description for number identification supplementary services using Signaling System No. 7: Malicious Call Identification (MCID)".

As an alternative or in a cumulative manner, a method in accordance with BICC standard (Bearer Independent Call Control) performance feature set Two (CS2—Capability Set) is used for transmitting the identifier request, see ITU-T Q.1902.1 to Q. 1902.6. With regard to a next alternative, the identifier request is transmitted according to the SIP-T protocol (SIP for Telephones) in accordance with RFC 3204 of the IETF (Internet Engineering Task Force).

The use of the aforementioned standards offers the facility whereby essentially only method steps for requesting the identifier between the network transition unit and the signaling unit still need to be redefined. With regard to conveying the identifier as far as the network transition unit, it is possible to make use to a large extent or completely of methods which have already been defined.

The ISUP standard can also extended such that it is suitable for the signaling in respect of data transmission from one telephone network by way of a data packet transmission network to another telephone network. This extension can also be used if the one terminal device is situated in the data packet transmission network.

With regard to another development of the method according to the invention, the calling terminal device is a terminal device in a data packet transmission network. The signaling unit or another signaling unit checks the access authorization of the calling terminal device for the data packet transmission network. Signaling units which perform such checks are referred to for example as proxy or gatekeeper. By virtue of the check on the access authorization of the calling terminal device, any manipulation of the identifier conveyed by the calling terminal device is rendered more difficult. With a high degree of probability, the noted identifier thus matches the actual identifier of the calling terminal device.

With regard to a next development, the detection request is transmitted in an INFO message using the INFO method according to de facto standard RFC 2976 of the IETF. The INFO message is also referred to as a request. A header section of the INFO message or a body section of the INFO message contains an information element which serves to uniquely identify the detection request, for example an information element "Printout" which is used to request the printout of the identifier in the signaling unit. This development is based on the already defined INFO message. Only small extensions are thus required in order to implement the method in signaling units and terminal devices.

With regard to another development, the detection request is transmitted in a message using a method in accordance with an RFC defined for the detection of calls. The definition of an additional RFC is useful particularly in a situation when a plurality of further information elements are required in conjunction with the method for detecting calls.

With regard to one embodiment, the occurrence of the message itself is actually the request, with the result that no additional information elements are contained in the message in order to identify the detection request. Alternatively, however, the message contains in its header or in its body an information element which uniquely identifies the detection request.

With regard to one development, the following data is also noted in addition to the identifier of the calling terminal device:

the identifier of the called terminal device,
in the case of a call diversion, the identifiers of all terminal devices involved in the call diversion,
the date and the time of the data transmission,
identifiers for the signaling units involved in the call processing, and
identifiers which are relevant to the transmission of the user data, for example an IP address and the associated RTP port number (Real Time Protocol) of the network transition unit 28 and/or the terminal device 36.

The "Detection of Calls" performance feature is upgraded by the storage of the additional data.

In addition, the invention relates to a terminal device and a signaling unit which are suitable for executing the method according to the invention or one of its developments. Furthermore, it concerns programs which are executed in the terminal device or in the signaling unit and are used for executing the method according to the invention or one of its developments. Consequently, the aforementioned technical effects apply to the terminal device, the signaling unit and the programs.

BRIEF DESCRIPTION OF THE DRAWINGS

Embodiments of the invention will be described in the following with reference to the attached drawings. In the drawings:

FIG. 3 shows messages transferred on the Internet for using the "Detection of a Call" performance feature.

DETAILED DESCRIPTION OF INVENTION

Figure 1:
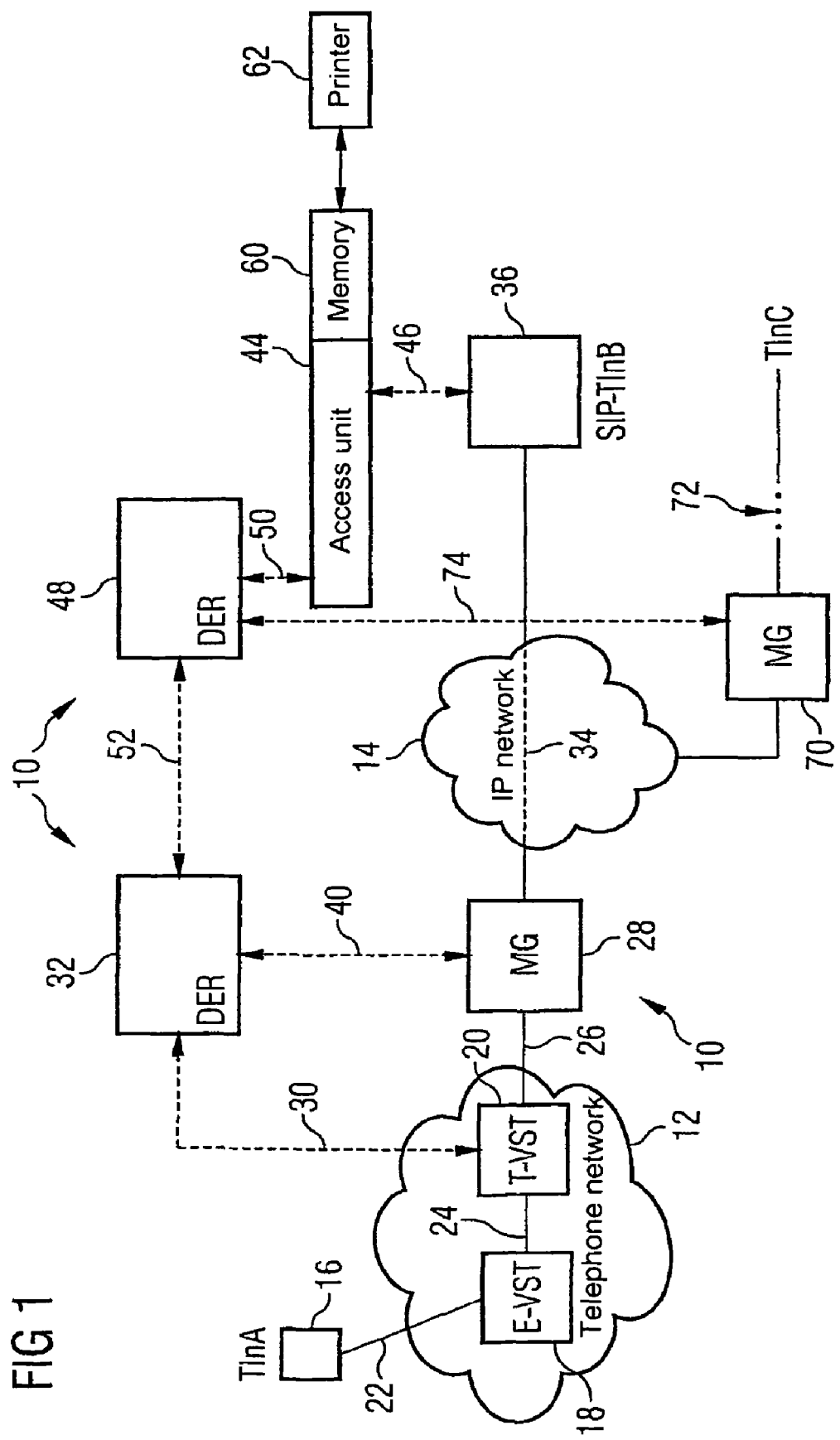
FIG. 1 shows units of a telephone network and of the Internet for data transmission between a telephone and a SIP terminal device and also for the associated signaling.

FIG. 1 shows a network transition function 10 between a telephone network 12 and a data packet transmission network 14, the Internet for example. The telephone network 12 is for example the telephone network operated by Deutsche Telekom AG. FIG. 1 shows a telephone 16 of a calling subscriber TlnA, a source switching center 18 and a transit switching center 20 of the telephone network 12. A subscriber connection line 22 exists between the terminal device 16 and the source switching center 18.

The source switching center 18 is connected to the transit switching center 20 by way of a PCM-30 transmission path 24. The call data is transmitted in a time channel, and the signaling is carried out in accordance with the ISUP protocol. The source switching center 18 and the transit switching center 20 are for example conventional switching centers of the EWSD type produced by the company Siemens AG.

A PCM-30 transmission path 26 leads from the transit switching center 20 for transmitting the user data to a network transition unit 28 which provides a part of the network transition function 10. A signaling connection 30 exists between the transit switching center 20 and a service provision computer 32 which likewise provides a part of the network transition function 10. Signaling takes place on the signaling connection 30 according to the ISUP protocol. The network transition unit 28 is for example a network transition unit of type hiG 1000 from the company SIEMENS AG. The service provision computer 32 is a service provision computer of type hiQ 9200 from the company SIEMENS AG.

The network transition unit 28 takes voice data, which is received in a PCM channel of the transmission path 26, from the PCM channel and packs it into data packets which are forwarded in the data packet transmission network 14, for example by way of a transmission path 34 which connects from the network transition unit 28 through the data transmission network 14 to a SIP terminal device 36 belonging to a subscriber TlnB. The terminal device 36 operates according to the SIP protocol, see de facto standard RFC 2543. On the other hand, data packets received from the data packet transmission network 14 are unpacked in the network transition unit 28. The user data contained in the data packets is forwarded in a time channel on the transmission path 26.

The service provision computer 32 controls the network transition unit 28 with the aid of the MGCP protocol (Media Gateway Control Protocol), see RFC 2705 of the IETF. Control messages generated in this situation are transmitted by way of a transmission path 40 which passes through the Internet for example.

The terminal device 36 has an access unit 44 assigned to it which is also referred to as a proxy unit. The access unit 44 checks the access authorization of the terminal device 36 and makes available SIP services, in particular the service for providing the "Detection of a Call" performance feature. The access unit 44 is for example an access unit of type hiQ 6200 from the company SIEMENS AG.

A signaling path 46 exists, for example in a local data transmission network, between the terminal device 36 and the access unit 44. Messages are exchanged over the signaling path 46 using the SIP protocol.

On the other hand, between the access unit 44 and a service provision computer 48 there exists a signaling path 50 by way of which signaling messages are likewise transmitted in accordance with the SIP protocol, for example. The service provision computer 48 is also, for example, a service provision computer of type hiQ 9200 from the company SIEMENS AG.

Between the two service provision computers 32 and 48 there exists a signaling path 52 over which signaling messages are transmitted in accordance with the BICC standard (Bearer Independent Call Control). If necessary, a so-called call mediation network node according to the BICC standard is also included in the signaling path 52.

It is assumed that the subscriber TlnA has already made a malicious call to the subscriber TlnB on one occasion. As a result the subscriber TlnB has applied to his SIP service provider for the "Detection of a Call on Request" performance feature to be enabled. The performance feature has been enabled in the access unit 44 for the subscriber TlnB.

In order to provide the "Detection of Calls" performance feature, the access unit 44 contains a memory unit 60 in which the acquired data can be stored permanently, and also a printer 62 which can be used to have the acquired data printed immediately. The method steps carried out with regard to provision of the "Detection of a Call on Request" performance feature are described in detail below with reference to FIG. 3.

In addition, FIG. 1 shows a further network transition unit 70 which is situated between the Internet 14 and a telephone network 72 to which the terminal device of a subscriber TlnC is connected. A transmission path 74 can be used for the exchange of control messages according to MGCP and is situated between the network transition unit 70 and the service provision computer 48.

Figure 2:
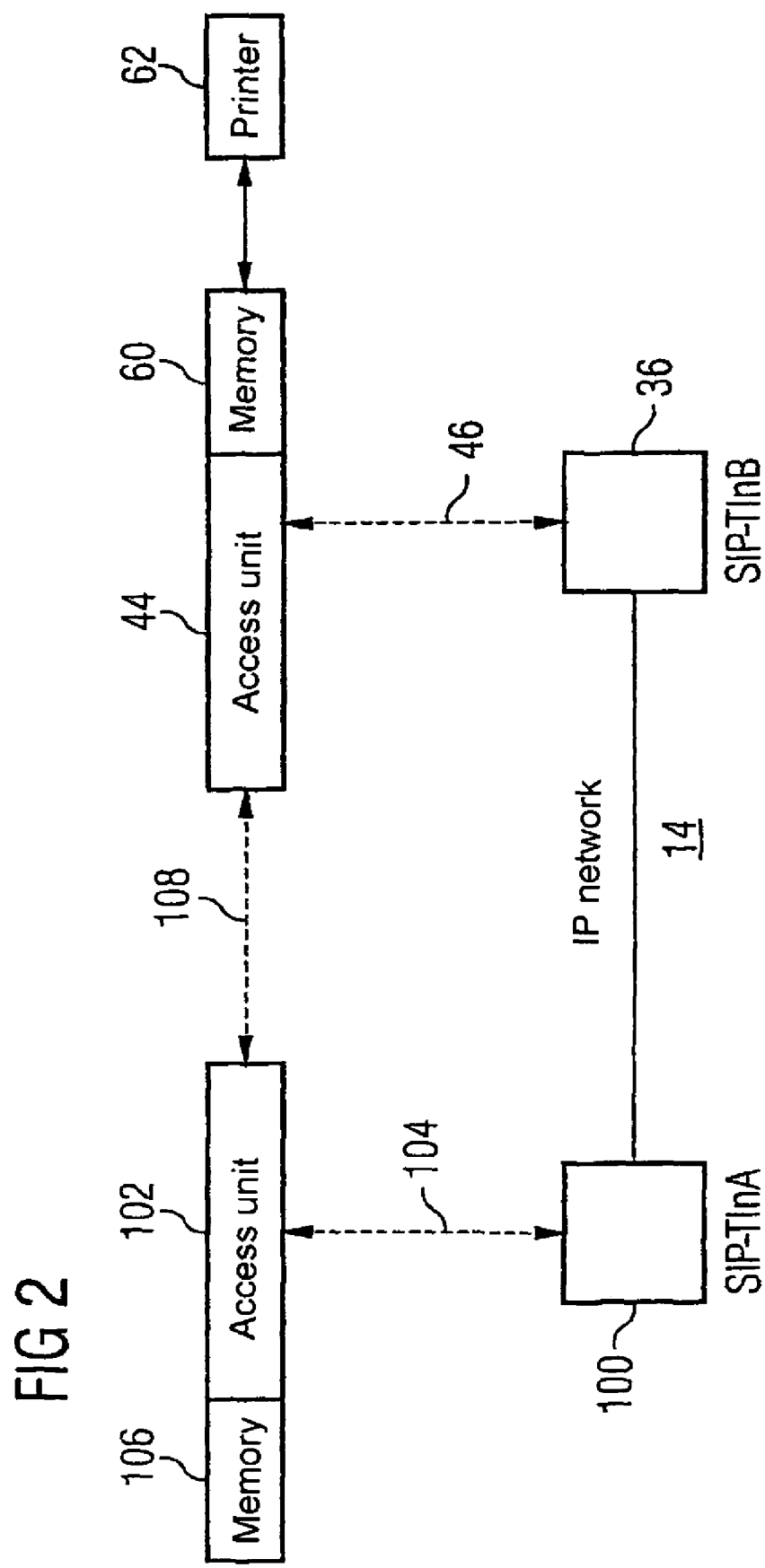
FIG. 2 shows units of the Internet for data transmission between two SIP terminal devices and also for the associated signaling.

FIG. 2 shows the case in which the subscriber TlnA does not use his telephone 16 but uses a SIP terminal device 100 in order to call the subscriber TlnB. Signaling messages can be transmitted between the terminal device 100 and an access unit 102 by way of a signaling path 104 according to the SIP protocol. The access unit 102 is likewise a proxy unit which checks the access authorization of the terminal device 100 for the data transmission network 14. The access unit 102 contains the memory unit 106.

Between the access unit 102 and the access unit 44 there exists a signaling path 108 over which signaling messages are transmitted according to the SIP protocol.

FIG. 3 shows messages transmitted in the data transmission network 14 when using the "Detection of a Call on Request" performance feature. The messages described with reference to FIG. 3 are exchanged regardless of whether the subscriber TlnA is calling from the telephone 16 or from the SIP terminal device 100. The service provision computer 48 is involved in the former case, whereas if the subscriber TlnA calls from the SIP terminal device 100 then the access unit 102 is involved.

In FIG. 3, operations which relate to the access unit 44 are represented with the aid of a time shaft 120. Operations which relate to the terminal device 36 are represented with the aid of a time shaft 122. Later points in time are situated further down than earlier points in time on the time shafts 120 and 122.

When subscriber TlnA calls subscriber TlnB, an Invite message 124 which comes from the service provision computer 48 or from the access unit 102 is received in the access unit 44 at a time t0. The Invite message 124 is processed in the access unit 44 according to the SIP protocol such that at a time t2 an Invite message 126 is sent from the access unit 44 to the terminal device 36. The Invite message also contains the subscriber number of the telephone 16 or the Internet address and the port address of the terminal device 100. The subscriber number of the telephone 16 or the identifier of the terminal device 100 is stored in a working storage facility in the memory unit 60 for the duration of call processing.

In the terminal device 36 the Invite message 126 is likewise processed in accordance with the SIP protocol. According to the protocol, at a point in time t4 a 200-OK message 128 is sent by the terminal device 36 as a confirmation to the access unit 44.

After receiving the message 128, according to the protocol at a point in time t6 the access unit 44 sends a 200-OK message 130 to the service provision computer 48 or to the access unit 102. From the side of the service provision computer 48 or the access unit 102, according to the protocol at a point in time t8 an ACK message 132 arrives which serves to confirm that the data transmission connection can be used.

As a result of the message 132, at a point in time t10 the access unit 44 sends an ACK message 134 to the terminal device 36 according to the protocol.

At a point in time t12, the subscribers TlnA and TlnB begin to speak to one another, whereby call data is transmitted between the telephone 16 and the terminal device 36 or between the terminal device 100 and the terminal device 36. The subscriber TlnB recognizes the voice of the malicious subscriber TlnA again and presses a function key on his terminal device which is linked to the function "Detection of a Call on Request". Thereupon at a point in time t14 the terminal device 36 automatically generates an INFO message 136 according to RFC 2976. The message 136 contains a user-specific information element "Printout".

The INFO message 136 is received and evaluated in the access unit 44. As a result of the information element "Printout", at a point in time t 16 the subscriber number of the subscriber TlnA which is known in the access unit 44 or the identifier of the terminal device 100 is stored permanently in a non-volatile memory in the memory unit 60, for example in a file together with other identifiers which are to be stored for other subscribers or only for the subscriber TlnB in conjunction with the "Detection of a Call on Request" performance feature. At the same time, this identifier is printed out on the printer 62. Permanently means that the data also remains noted after the end of the call between the subscriber TlnA and the subscriber TlnB until it is printed out in order then for example to be used as evidence in legal proceedings.

At a point in time t18, the access unit 44 confirms the INFO message 136 with the aid of a 200-OK message 138. The call between the subscribers TlnA and TlnB is then continued, or the subscriber TlnB terminates the call immediately.

With regard to another embodiment, in place of the INFO message 136 a SIP message "MCID-REG" separately defined for the "Detection of a Call on Request" performance feature is sent. The MCID-REG message also results in the subscriber number of the telephone 16 or the Internet address of the terminal device 100 being detected and permanently noted.

In place of the signaling protocol on the transmission paths 40 and 74, the signaling protocol ITU-T H.248 can also be used for example.

In place of the method for data transmission between the telephone network 12 and the Internet 14 described with reference to FIG. 1, a different method can also be used, for example the functions of the service provision computer 48 can also be included amongst those provided by the service provision computer 32.

In place of the method described with reference to FIG. 2, other methods can likewise be used. For example, further access units can also be incorporated into the signaling between the access units 102 and 44. The user data can also be transmitted with the aid of the access units 102, 44 or the further access units.

With regard to a further embodiment, the "General Detection of Calls" performance feature is enabled by the service provider for the subscriber TlnB, for example upon application by the subscriber. The identifier of the terminal device 36 is noted in a file. Upon receipt of a call, the identifier of the terminal device to be called is determined. The file is searched for this identifier. If the identifier is contained in the file, then the identifier of the called terminal device is noted, for example stored and/or printed. However, if the identifier is not contained in the file, then the identifier of the calling terminal device is not permanently noted. The call establishment is carried out regardless of the result of the check. With regard to this embodiment, no detection request is required from the subscriber TlnB in order to permanently note the subscriber number of the calling terminal device.

The invention claimed is:

1. A method for detecting a malicious call, comprising:
receiving, by a signaling unit, a first call request of a calling terminal;
sending a second call request from the signaling unit to a called terminal device, the called terminal device operates according to a session initiation protocol;
enabling a data transmission between the calling and called terminal device;
transmitting user data between the calling terminal device and the called terminal device; receiving a detection request in order to detect the malicious call of the calling terminal, the detection request initiated by a user of the called terminal and formed according to the session initiation protocol;
noting, by the signaling unit, an identifier for the calling terminal device; and
storing the identifier permanently in a memory unit after receiving the detection request;
wherein the called terminal device is a terminal device in a data packet transmission network,
wherein the signaling unit performs signaling between the signaling unit and the called terminal device in accordance with the session initiation protocols,
wherein the detection request is transmitted in an INFO message using the INFO method according to RFC 2976, and that a header section of the INFO message or a body section of the INFO message contains an information element which serves to uniquely identify the detection request.

2. The method according to claim 1, wherein the detection request is sent to the signaling unit from the called terminal device during the data transmission or in conjunction with the signaling relating to the data transmission and the signaling unit notes the identifier on the basis of the detection request and that the detection request is transmitted with a message and/or an information element which has been defined for the signaling in the data packet transmission network.

3. The method according to claim 1, wherein an identifier is stored for the called terminal device, and upon arrival of the call request, a check is performed by the signaling unit as to whether the identifier of the terminal device to be called has been stored and that the identifier of the calling terminal device is noted when the identifier of the terminal device to be called has been stored.

4. The method according to claim 1, wherein the identifier of the calling terminal device is conveyed to the signaling unit in conjunction with the call request.

5. The method according to claim 1, wherein the calling terminal device is a terminal device in a circuit-switched data transmission network.

6. The method according to claim 5, wherein the identifier of the calling terminal device is requested as a result of the detection request by the signaling unit by way of a network transition unit to the circuit-switched data transmission network with the aid of an identifier request.

7. The method according to claim 5, wherein in order to process the identifier request in the circuit-switched data transmission network a ITU-T standard Q.731 method is used.

8. The method according to claim 1, wherein the identifier request is transmitted in accordance with at least one of the standards Q.1902.1 to Q.1902.6 and/or according to SIP-T.

9. The method according to claim 1, wherein the calling terminal device is a terminal device in a data packet transmission network and that the signaling unit or another signaling unit checks the access authorization of the calling terminal device for the data packet transmission network.

10. The method according to claim 1, wherein in addition to the identifier of the calling terminal device the identifier of the called terminal device is noted.

11. The method according to claim 1, wherein in the case of a call diversion the identifiers of all terminal devices involved in the call diversion are noted.

12. The method according to claim 1, wherein the date is noted.

13. The method according to claim 1, wherein the time is noted.

14. The method according to claim 1, wherein at least one identifier for the signaling units involved in the call processing is noted.

15. The method according to claim 1, wherein the identifiers that are relevant to the transmission of the user data by way of the data packet transmission network are stored.

16. A session initiation protocol terminal device for detecting electronic calls, comprising:
- a connection unit for connecting the session initiation protocol terminal device to a data packet transmission network; and
- a control unit containing a function that generates a detection request automatically at the instigation of a person operating the session initiation protocol terminal device, the detection request generated according to a session initiation protocol and subsequently sent to a signaling unit, and when the detection request is processed the signaling unit notes an identifier of a terminal device calling the terminal device,
- wherein the detection request is in order to detect a malicious call from the terminal device calling the terminal device, and
- wherein the detection request is generated in an INFO message using the INFO method according to RFC 2976, and that a header section of the INFO message or a body section of the INFO message contains an information element which serves to uniquely identify the detection request.

17. A signaling unit for detecting electronic calls, comprising:
- a control unit that signals and provides a function that automatically notes an identifier of a terminal device calling the called terminal device;
- a session initiation protocol used to provide signaling between the signaling unit and the called terminal device, and
- a detection request message from the called terminal device, the message indicating that the call from the calling terminal device is a malicious call, the detection request formed according to a session initiation protocol,
- wherein the detection request is generated in an INFO message using the INFO method according to RFC 2976, and that a header section of the INFO message or a body section of the INFO message contains an information element which serves to uniquely identify the detection request.

18. The method according to claim 1, wherein the first call request, received by the signaling unit, is in accordance with the session initiation protocol.

* * * * *